(No Model.) 2 Sheets—Sheet 2.
O. BRAUN.
Cooling Apparatus for Condensing Vapors.
No. 243,496. Patented June 28, 1881.
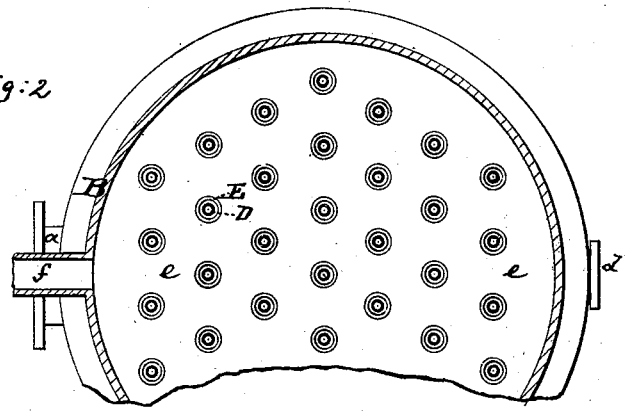
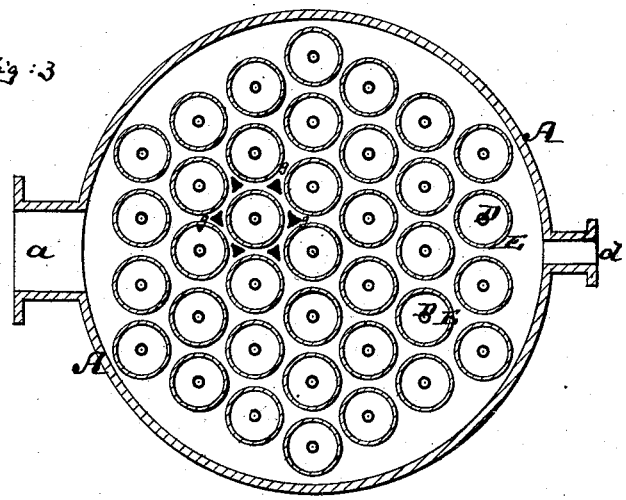
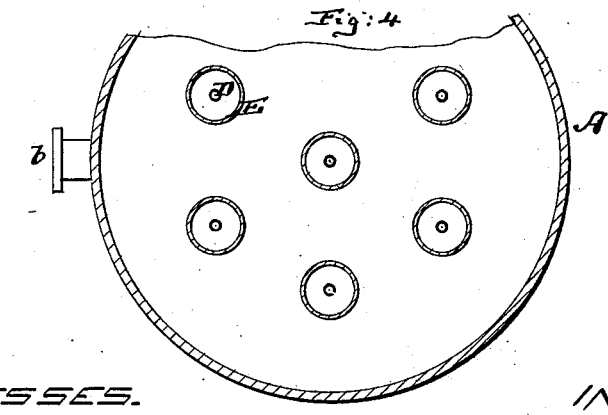
WITNESSES.
H. A. Parker
Willy H. E. Schultz
INVENTOR.
Otto Braun
by his attorney
A. v. Briesen

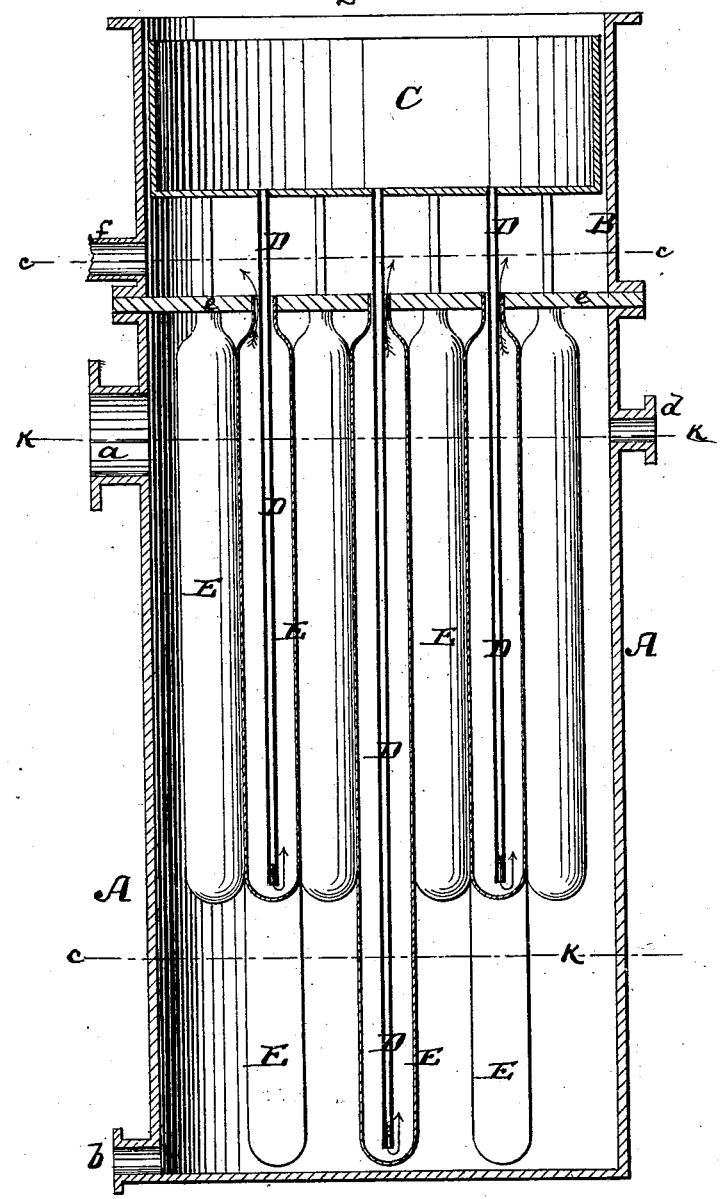

UNITED STATES PATENT OFFICE.

OTTO BRAUN, OF BERLIN, PRUSSIA, GERMANY.

COOLING APPARATUS FOR CONDENSING VAPORS.

SPECIFICATION forming part of Letters Patent No. 243,496, dated June 28, 1881.

Application filed August 30, 1880. (No model.) Patented in Germany July 15, 1879.

*To all whom it may concern:*

Be it known that I, OTTO BRAUN, of Berlin, Prussia, in the Empire of Germany, have invented an Improved Cooling Apparatus for Condensing Vapors, (for which I have obtained German Patent No. 8,585, for fifteen years, dated July 15, 1879,) of which the following is a specification.

Figure 1 is a vertical central section of my improved cooling apparatus. Figs. 2, 3, and 4 are horizontal sections of the same, taken on the planes of the lines *c c*, *k k*, and *c k*, Fig. 1, respectively.

The object of this invention is to produce a cooling apparatus and condensing apparatus which shall be particularly useful for condensing vapors or mixed gases having varying temperatures of condensation. It is comparatively easy to condense pure steam or any pure and single vapor, but when the steam is charged with oleaginous or other vapors which do not condense at the same temperature as the steam itself proper condensation becomes exceedingly difficult. One essential element of an apparatus which shall overcome these difficulties is that the cooling-surfaces shall be very close together, and that the cooling liquid shall travel in an upward direction.

To this end my invention consists in the arrangement and combination of parts hereinafter more fully described.

In the accompanying drawings, the letter A represents a cylindrical or other shaped vessel intended to receive the vapors to be condensed or liquid to be cooled. Near its upper end this vessel is provided with an inlet-pipe, *a*, for the reception of the vapors, near its lower end with an outlet-pipe, *b*, for the discharge of the liquid of condensation, and near its upper end with another outlet-pipe, *d*, for the discharge of the vapors that are not condensable. The top plate, *e*, of this vessel A is pierced with a series of holes, and serves to support a vessel, B, and within or above said vessel B is another vessel, C, for receiving the cooling liquid. A number of pipes, D D, extend from the bottom of the vessel C downward through the vessel B, and through the top plate, *e*, of the vessel A into the said vessel A, each of the pipes D being open at both ends.

E E are bottle-shaped pipes, which are suspended from the plate *e* into the vessel A, and which surround the lower parts of the pipes D D. The pipes E are open at their upper ends and closed at their lower ends, and the pipes D extend, respectively, into pipes E, reaching very near to the bottom of the latter. The cooling liquid from the vessel E drops downward through the pipes D into the lower ends of the pipes E, and ascends in the pipes E until it reaches their contracted though still open upper ends, whence it escapes into the vessel B and is thence discharged through a suitable pipe, *f*. Thus it will be seen that the cooling liquid ascends in the pipes E that are exposed to contact with the vapors to be condensed or with the liquid to be cooled. It will likewise be seen that by contracting the upper ends of the pipes E the carrying-plate *e*, where it is perforated for the passage of the pipes D and the suspension of the pipes E, is not weakened, and yet the cooling-surfaces within the vessel A are brought very close together.

Fig. 2 shows the comparative great distance from each other of the holes through the plate *e*, and Fig. 3 shows the comparative close approach to each other within the vessel A of the pipes E, Fig. 3 showing, likewise, that the liquid to be cooled has but very narrow passages between the pipes E, and is therefore fully exposed to the cooling-surfaces.

In order to give more room for the collection of the liquid already cooled or condensed I prefer to make some of the pipes E longer than the others, as shown in the lower part of Figs. 1 and 4, so that only in the upper part of the vessel A, where the cooling process must primarily take place, will the pipes E be close together.

If desired, the pipes E may be polygonal instead of circular in cross-section, in which case the spaces between them will be of exactly the same width throughout. The same result of equalizing the distances can be obtained by inserting vertical rods *g* in the vessel A, between the several circular pipes E, as shown at *g* in Fig. 3.

The apparatus is useful for condensing vapors, for cooling gases, such as illuminating-gas, generator-gas, also for cooling liquids, and, if inverted, for warming liquids or gases, in which latter case, of course, the vessels B and C must be closed, except where the inlet and discharge pipes are applied.

The apparatus can be made of suitable material—metal, glass, porcelain, clay, &c. The number of pipes E may be varied, and in some cases one such pipe will answer the purpose.

I do not claim the tubes D combined with outer tubes if both are suspended from the same plate, as this has previously been done.

I claim—

1. A cooling apparatus containing one or more pipes, E, suspended from the top of a vessel, A, and one or more open-ended pipes, D, suspended therein from the bottom of an upper vessel, C, in combination with the perforated plate e and vessels A and C, all arranged so that the cooling liquid will travel from the vessel C through the pipes D into the pipes E, and within the outer pipe or pipes, E, into the vessel B, substantially as described.

2. In a cooling apparatus, the cooling-pipe E, suspended from the plate e and contracted at the upper end, substantially as described.

3. The combination, in a cooling apparatus, of the vessel A, having perforated plate e, vessel B, surmounting plate e, and vessel C above plate e, within vessel B, and pipes D and E, all arranged so that the cooling liquid will travel downward from the vessel C through the pipes D and upward through the pipes E, substantially as described.

4. In a cooling or condensing apparatus, the combination, within the vessel A, of the cooling-pipes E E, with the interposed rods for equalizing the open spaces between said pipes, substantially as herein shown and described.

In testimony whereof I have hereunto set my name in the presence of two subscribing witnesses this 1st day of August, 1879.

OTTO BRAUN.

Witnesses:
PAUL WENTSEHER,
BERTHOLD ROI.